June 25, 1963  R. CLAAS  3,094,829
COMBINE HARVESTER

Filed Jan. 9, 1961  2 Sheets-Sheet 1

INVENTOR
Reinhold Claas
BY Michael S. Stryker
       Attorney

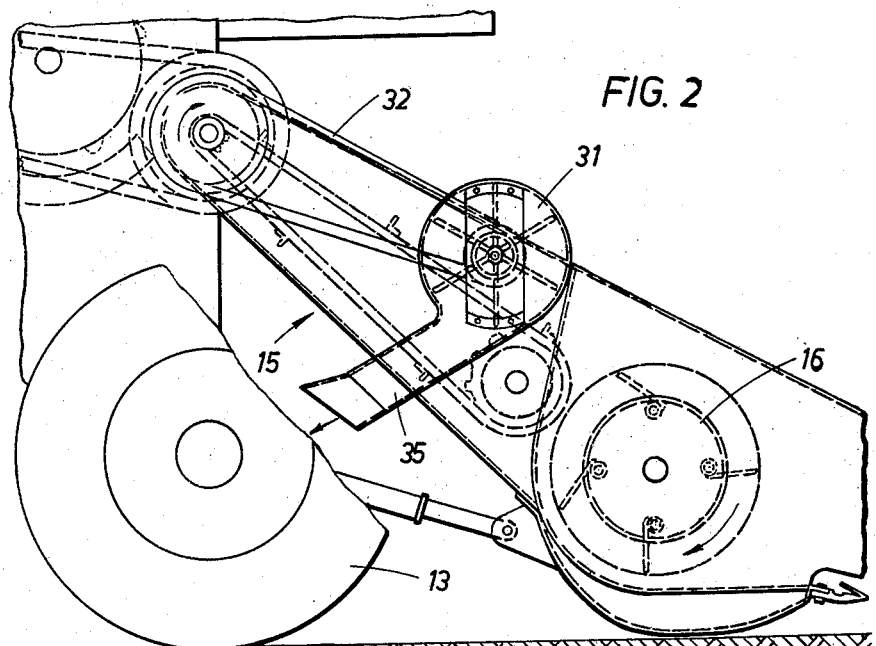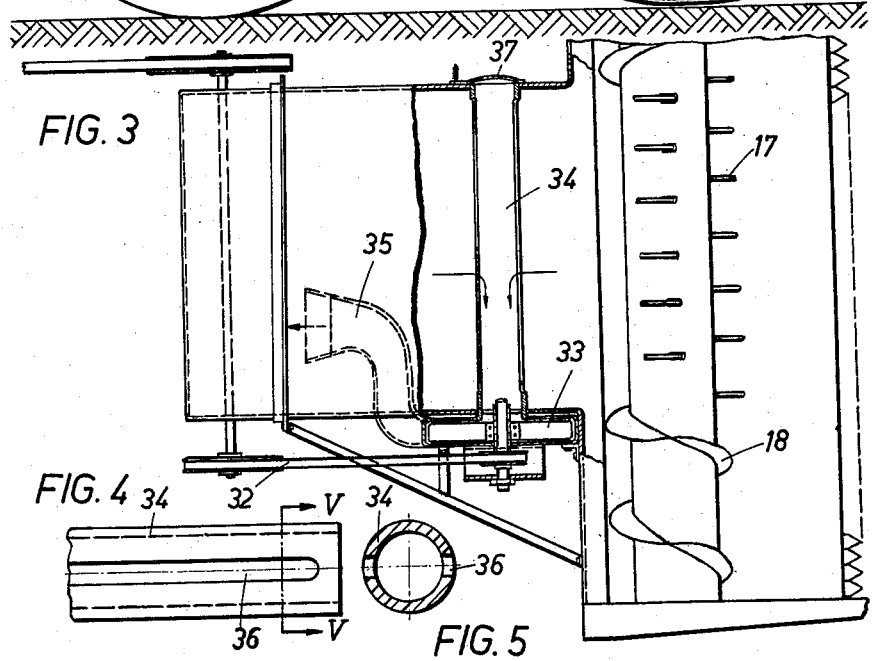

3,094,829
COMBINE HARVESTER
Reinhold Claas, 64 August-Claas Strasse, Harsewinkel,
Westphalia, Germany
Filed Jan. 9, 1961, Ser. No. 81,428
Claims priority, application Germany Jan. 12, 1960
4 Claims. (Cl. 56—26)

This invention relates to combine harvesters, and more specifically to a combine harvester comprising means for cutting and receiving the crop and means for conveying the same to the threshing mechanism.

It is a matter of general experience that combine harvesters in operation throw up a considerable volume of dust and that in the absence of wind this dust may occasionally seriously inconvenience the driver of the combine harvester. Since it is not uncommon for harvesting machinery other than combine harvesters, such as in binders and so forth, to raise considerable dust, this has in the past been accepted as an unavoidable nuisance although it is already known in stationary threshing machines to provide, on the suction side of the fan associated with the dresser, a suction box with a suction hose for cleaning the machine when the work of threshing has been completed. However, no particular thought has so far been given to the fact that driving a combine harvester calls for a much greater degree of attention and care on the part of the driver than the operation of any other harvesting implement.

It is the object of the present invention to provide a combine harvester of the above-defined type which facilitates the difficult task the driver is called upon to perform.

Substantially the invention proposes to provide a combine harvester which comprises a cutter assembly, conveying means for feeding the crop to a threshing mechanism, and a dust extraction device located in the vicinity of the conveying means and adapted to take effect when the conveying means are in operation.

The principal purpose of the dust extraction is to prevent dust from obscuring the driver's view from his seat. Furthermore, the proposed dust extraction device may be suitably contrived and constructed to intercept foreign particles of larger size, the seeds of weeds and the like, in operation. The dust extraction device ensures that the driver's view will not be impaired even in adverse conditions, thus permitting him to do his difficult work without inconvenience. Although the provision of the dust extraction device increases the consumption of power, its effect is nevertheless to improve the overall efficiency of the machine very appreciably.

The invention may be embodied in a large number of different ways. In a particularly useful arrangement one or more suction openings extend across the whole width of the conveying means, i.e. across the path along which the crop is conveyed to the threshing mechanism. Although a large suction opening extending across part of the width of this path might be sufficient for achieving the contemplated result, this would normally necessitate a higher capacity fan and a correspondingly increased consumption of power. It will therefore usually be best to use one branch extending across the full width of the path of travel of the conveyed crop and to provide said branch with preferably slit-shaped suction openings for drawing in the dust-laden air. In certain cases it may be advisable to arrange the suction openings to face different directions with a view to exposing a wider region to the suction effect.

The suction opening may be located inside the elevator housing. For instance, it may be located above the elevator chain inside the elevator housing and a general form of construction of the combine harvester under the driver's platform of the combine harvester in order to screen the driver from all the dust that may be evolved.

The exhaust duct of the extraction device may likewise be arranged in various ways. Generally it will be preferred to widen the outlet opening in the form of a funnel in order to reduce the velocity of the issuing blast of dust-laden air, and thus to ensure that the dust will more quickly settle. Generally speaking, the outlet opening of the exhaust duct should be close to the ground.

The consumption of power for driving the dust extraction device will be especially low if the stream of dust-laden air is directly discharged.

It will usually be advisable to provide a separate thresher fan for operating the dust extraction device and to drive said fan from the drive means of the combine harvester.

A preferred embodiment of the invention will now be described by way of example and with reference to the accompanying drawings, in which:

FIG. 2 is a similar view, on a larger scale, of parts of the combine harvester associated more particularly with the cutter assembly;

FIG. 3 is a top plan view of parts of the combine harvester which are more especially relevant to the present invention;

FIG. 4 is a fragmentary view of a suction branch, and

FIG. 5 is a section therethrough, taken on the line V—V of FIG. 4.

Figure 1:
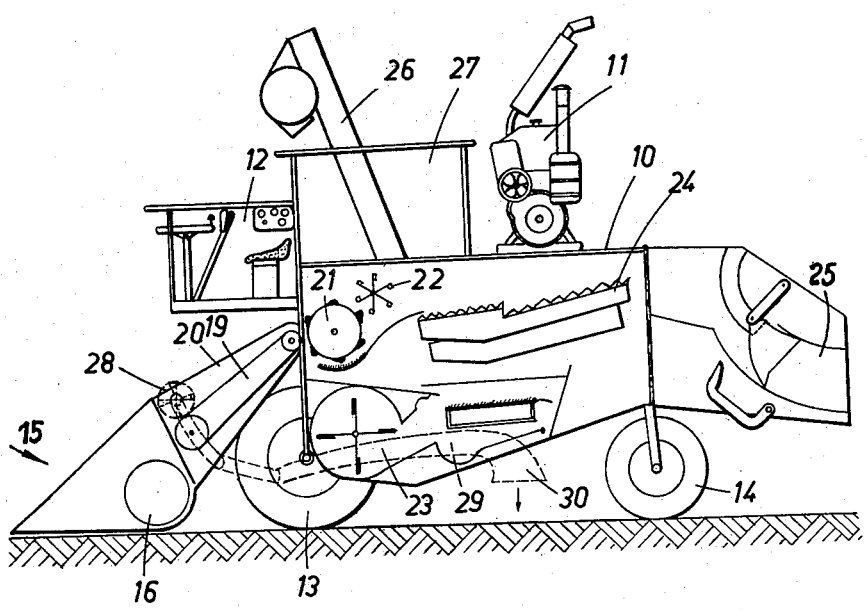
FIG. 1 is a schematic elevation of a combine harvester according to the invention.

The combine harvester illustrated in FIG. 1 has a body 10 surmounted by a power unit 11 and a driver's platform 12. The machine runs on driven wheels 13 and steerable wheels 14. Attached to the forward end of the body 10 is a cutter assembly 15 adapted to be raised and lowered. This cutter assembly 15 comprises a cutter bar for cutting the crop, means for picking up the cut crop, an auger 16 with a centre section preferably fitted with swingably actuated feeder fingers 17 (FIG. 3), whereas the two end sections are fitted with screw helices 18 for sweeping the crop on to an elevator chain 19 which works in an elevator shaft 20. The elevator chain 19 delivers the crop to a threshing drum 21, and a beater 22. The grain from the threshing mechanism drops directly into the dresser which comprises a thresher fan 23, whereas the straw passes on to a shaker 24 and is finally ejected perferably through a baling press 25, or the like. The threshed corn is conveyed by a grain elevator in a shaft 26 to a bagging stand 27 on top of the body 10 of the machine.

Associated with the feeder elevator which is substantially located close to the cutter table is a dust extraction device. FIG. 1 illustrates a suction branch 28 inside the elevator housing 20 above the elevator chain 19 and below the front end of the driver's platform 12. The ducts associated with the suction branch lead to an extractor fan not shown in FIG. 1, adapted to deliver the extracted dust through an exhaust duct 29 under the body 10 of the combine harvester. In the illustrated embodiment an outlet opening 30 of the exhaust duct 29 widens to form a funnel-shaped mouth in order to reduce the velocity of the issuing dust-charged air.

FIGS. 2 and 3 show an illustrative example of an extractor fan 31 driven by a belt 32 from some other driven member in the machine, and associated with a suction branch 34 extending in the form of a tube coaxially with the axis of rotation of an impeller 33, whereas an exhaust duct 35 extends at an angle downwards towards the ground. The suction branch 34 in the illustrated preferred embodiment is provided with two longitudinal suction openings 36 which face different directions and which are preferably slit-shaped. The practical realisation of the thought which underlies the invention does not necessarily require the suction branch 34 to be coaxial with the impeller 33 of the extractor fan 31, although this is an arrangement which leads to a particularly simple form of construction. The end of the suction branch 34 is closed by a hinged cover 37 which can be easily undone and opened.

The described embodiment is merely illustrative of the invention and is not intended to limit its scope to this particular form of construction.

I claim:

1. In a combine harvester, in combination, a cutter assembly including a harvester table having a bottom wall, a cutter bar at a front edge of said bottom wall, and a transporting auger extending transversely to said harvester table above said bottom wall, rearwardly of and substantially parallel to said cutting bar; elongated mechanical conveying means including an elevator housing having an open front end facing said transporting auger and extending rearwardly therefrom, and conveying chain means extending longitudinally in said elevator housing for transporting the cut crop from said auger to a threshing mechanism of said combine harvester; and dust suction means carried by said harvester and including a single tubular member extending substantially parallel to said auger transversely through said open front end of said elevator housing fixed thereto above the chain means therein and being formed with a pair of elongated oppositely arranged suction openings extending uninterrupted substantially through the entire width of said elevator housing in direct contact with the atmosphere, one of said openings facing towards said transporting auger, removable closure means closing one end of said tubular member and suction fan means communicating with the other end of said tubular member.

2. A combine harvester as claimed in claim 1, wherein said dust suction means include an exhaust duct arranged to discharge the dust under the body of the combine harvester.

3. A combine harvester as claimed in claim 2, wherein said exhaust duct widens at an outlet and thereof to form a funnel-shaped mouth.

4. An arrangement as defined in claim 1 and including a driver's platform located above said elongated mechanical conveying means and in which said one suction opening of said dust suction means is located between said driver's platform and said mechanical conveying means.

References Cited in the file of this patent

UNITED STATES PATENTS

| | | |
|---|---|---|
| 1,844,750 | Ellis | Feb. 9, 1932 |
| 2,832,187 | Johnson | Apr. 29, 1958 |